No. 757,038. PATENTED APR. 12, 1904.
C. G. HAWKINS.
ANIMAL TRAP.
APPLICATION FILED JAN. 13, 1903. RENEWED NOV. 23, 1903.
NO MODEL.

Witnesses:
Henry Manger
Wm. W. Wallace

Inventor: Charles G. Hawkins.
by Orwig & Lane Atty's.

No. 757,038. Patented April 12, 1904.

UNITED STATES PATENT OFFICE.

CHARLES G. HAWKINS, OF DES MOINES, IOWA, ASSIGNOR OF ONE-HALF TO R. W. SWANSTON, OF DES MOINES, IOWA.

ANIMAL-TRAP.

SPECIFICATION forming part of Letters Patent No. 757,038, dated April 12, 1904.

Application filed January 13, 1903. Renewed November 23, 1903. Serial No. 182,411. (No model.)

*To all whom it may concern:*

Be it known that I, CHARLES G. HAWKINS, a citizen of the United States, residing at Des Moines, in the county of Polk and State of Iowa, have invented certain new and useful Improvements in Animal-Traps, of which the following is a specification.

The object of my invention is to provide an animal-trap of simple, durable, and inexpensive construction in which a platform of any ordinary size has arches attached to it which are easily held by my locking mechanism in a locked position and at the same time be easily released by any movement of the trigger.

A further object is to provide an animal-trap which can be approached from either direction and released by touching the trigger from either approach to the trap.

A further object is to provide a trap in which practically the entire platform of the trap will be covered by the arches when in their released position, so that an animal which is on any part of the platform will be held, provided he touches either of the triggers for releasing the arches when in their locked position, and, further, to provide a mechanism for raising and lowering the trigger in order to take advantage of any wear that may be prevalent in the use of the trap either by springing the wires apart or by rubbing.

My invention consists in certain details in the construction, arrangement, and combination of the various parts whereby the objects contemplated are attained, as hereinafter more fully set forth, pointed out in my claims, and illustrated in the accompanying drawings, in which—

Figure 1:
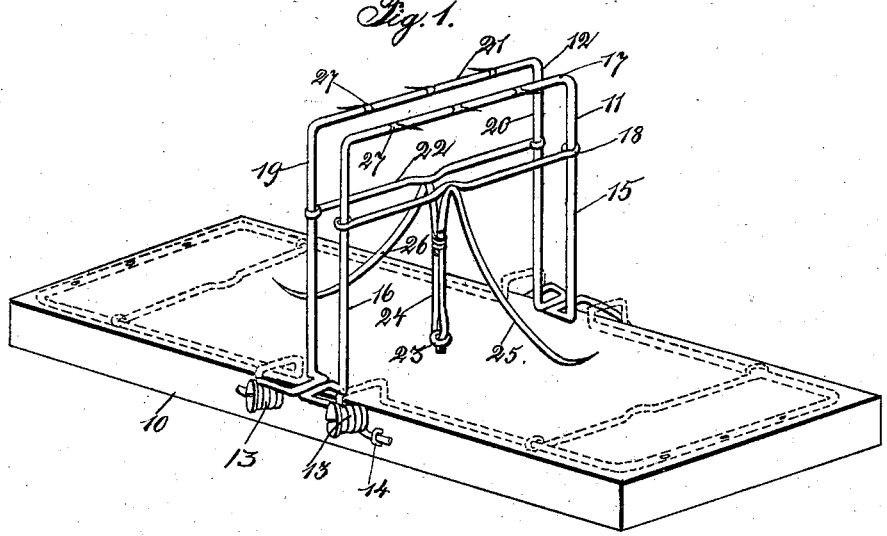
Figure 2:
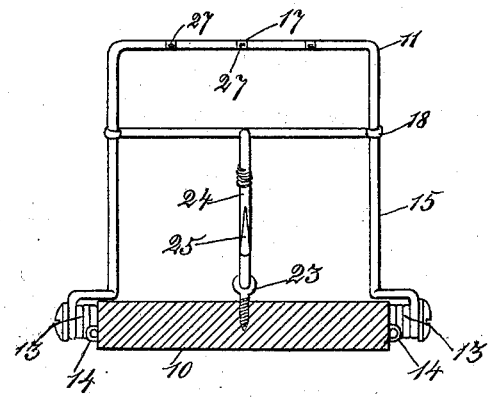

Figure 1 shows in perspective the entire trap with the arches in their locked position and the said arches shown in dotted lines in their released position against the surface of the platform. Fig. 2 shows a cross vertical sectional view of the device.

Referring to the accompanying drawings, I have used the reference-numeral 10 to indicate the platform of the device, which may be of any desirable size and is made of wood or other suitable material and of such shape that it will lie flat upon the floor, so that it will be easy for an animal, however small, to get on the upper surface of it. Attached to each side of the platform and near the central portion thereof are the spring-arches 11 and 12. A spring 13 is attached to the lower ends of said arches, and a staple 14 is passed around the lower end of the wire of which the arches are made and into the platform 10 to hold said arches firmly to the platform. The arches stand at substantially right angles to the upper surface of the platform when the spring has its full force against the arches. These arches are also attached in such a way that when the spring is in its released position the arches will lie perfectly flat upon the surface of the platform, so that any animal which causes the springs to be released will be held firmly between the arches and the surface of the platform by means of the springs 13, acting in conjunction with these arches. Between the uprights 15 and 16 of the arch 11 and parallel to the cross-piece 17 I have attached the connecting-wire 18 in such a manner that it will lie in substantially the same plane as the cross-piece 17. Between the uprights 19 and 20 of the arch 12 and parallel with the cross-piece 21 thereof I have attached the connecting-piece 22 in such a way that it will lie in substantially the same plane as the cross-piece 21. Attached near the central portion and in the upper surface of the platform I have provided the screw-eye 23, capable of vertical adjustment. Movably connected with the screw-eye 23 is the trigger, having the uprights 24 therein, said uprights being slightly separated at their upper extremity and having arms 25 and 26 extending away from the uprights 24 and running longitudinally of the platform. The uprights are designed to engage the arches and hold them in a locked position when it is so desired by the operator. At the end of each of the arms 25 and 26 is a sharpened point so constructed to enable the person setting the trap to put cheese or other bait thereon. I have attached barbs 27 to each of the arches 11 and 12.

In practical use and assuming that the arches are in their released position and that the operator desires to set the trap he grasps the arches by the cross-pieces 17 and 21 and raises them to a position substantially at right angles with the surface of the platform, and he then places the trigger in engagement with the connecting-pieces 18 and 22, and it will be seen that the springs 13, which are attached to the arches, counteract each other when these arches are in engagement with the trigger. The operator then places his bait on the sharpened points of the arms 25 and 26. The trap is then in position for use. Then presuming that an animal comes to the trigger and in eating the bait causes the slight movement of it, which movement releases the arches and causes them to come against the animal on the surface of the platform.

Having thus described my invention, what I claim, and desire to secure by Letters Patent of the United States therefor, is—

1. In an animal-trap, the combination of a platform, spring-arches attached to the edges of the platform, a trigger adjustably attached to the center of said platform for engaging and releasing said spring-arches, barbed arms in said trigger, extending over each end of the platform and away from its central portion, so arranged that the arches will be released from a locked position by moving the outer end of either of said arms, substantially as and for the purposes stated.

2. In a device of the class described, the combination of a platform, arches springingly attached to said platform and at the central portion of said platform, a connecting-piece in each of said arches between the uprights therein, a trigger attached to the central portion of said platform designed to engage each of said connecting-pieces, arms extending longitudinally of the platform and away from each other, substantially as and for the purposes stated.

3. In an animal-trap, the combination of a platform, spring-arches midway between the ends of said platform, a connecting-piece in each of said arches between the uprights therein, a trigger mounted in the upper surface of said platform, designed to engage said connecting-piece, and to release the spring-arches, substantially as and for the purposes stated.

4. In an animal-trap, the combination of a platform, springing arches midway between the ends of said platform, designed to spring from over the center of the platform away from each other, a connecting-piece between the uprights in each of said arches, a trigger adjustably attached in the upper surface of said platform, designed to engage the cross-pieces in said arches and to release the springing arches so that when released they will move in opposite directions, for the purposes stated.

5. In an animal-trap, the combination of a platform, arches springingly attached to the central portion of said platform, a trigger attached to the central portion of said platform for engaging said arches when they are in an upright position, arms on said trigger, extending longitudinally of the platform and away from each other, designed to release the arches from an upright position when either of said arms is moved, substantially as and for the purposes stated.

Des Moines, Iowa, January 9, 1902.

CHARLES G. HAWKINS.

Witnesses:
J. RALPH ORWIG,
W. R. LANE.